J. A. PLOPPER.
CHANGE MAKING MACHINE.
APPLICATION FILED OCT. 1, 1913.
1,194,316.
Patented Aug. 8, 1916.
9 SHEETS—SHEET 2.
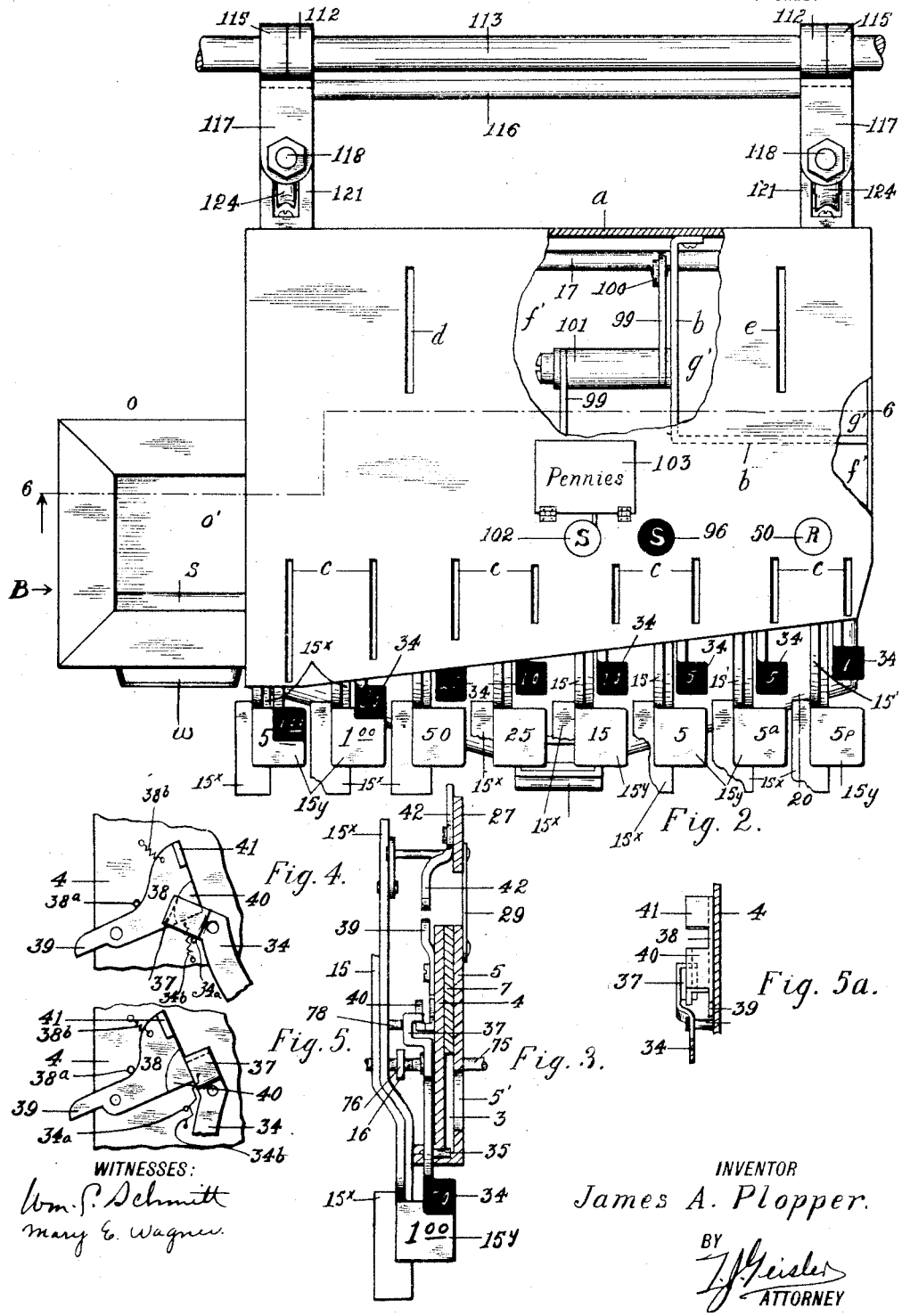
WITNESSES:
Wm. P. Schmitt
Mary E. Wagner
INVENTOR
James A. Plopper.
BY
T. J. Geisler
ATTORNEY J. A. PLOPPER.
CHANGE MAKING MACHINE.
APPLICATION FILED OCT. 1, 1913.
1,194,316.
Patented Aug. 8, 1916.
9 SHEETS—SHEET 3.
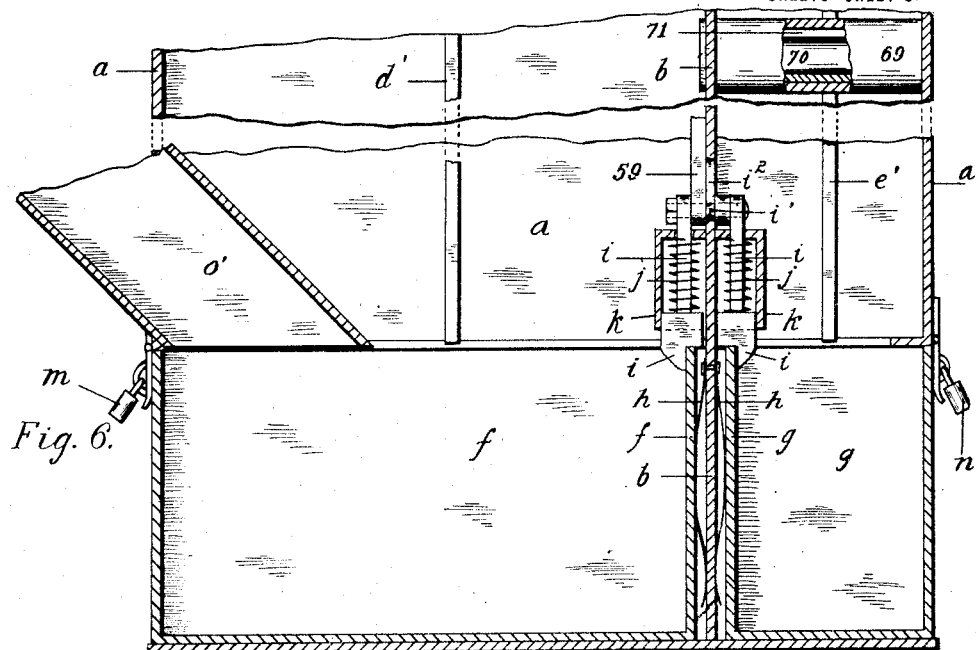
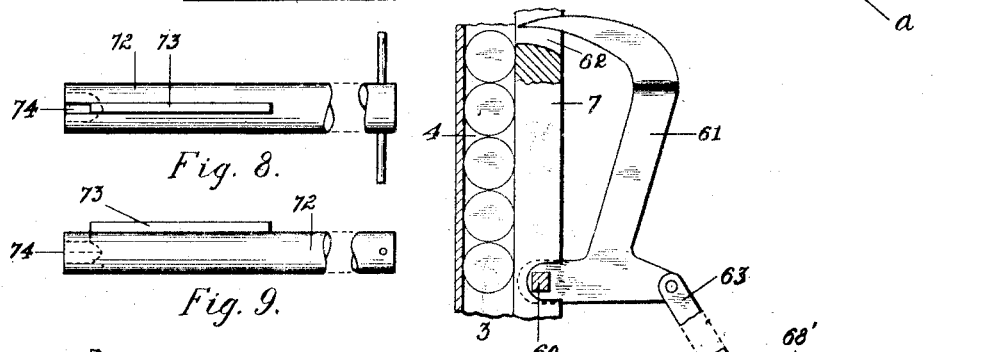
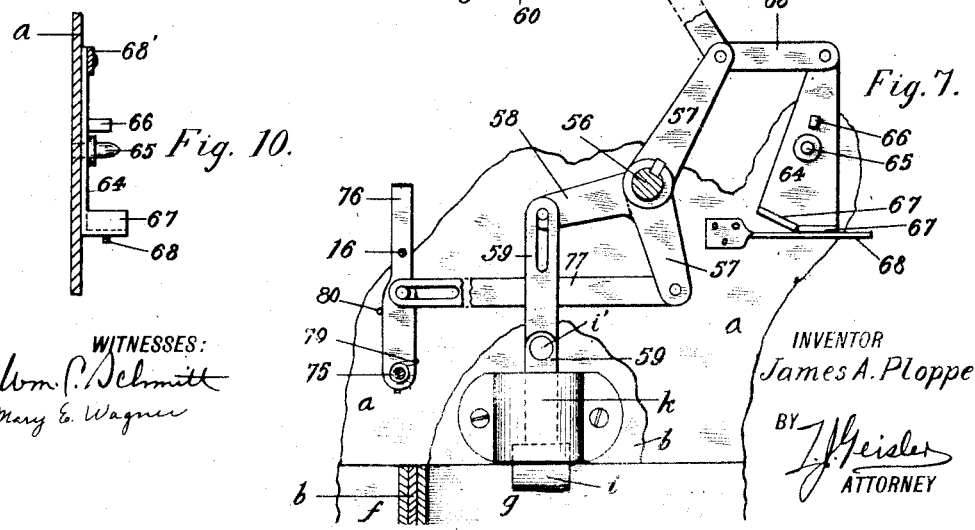
WITNESSES:
INVENTOR
James A. Plopper.
BY
ATTORNEY J. A. PLOPPER.
CHANGE MAKING MACHINE.
APPLICATION FILED OCT. 1, 1913.
1,194,316.
Patented Aug. 8, 1916.
9 SHEETS—SHEET 4.
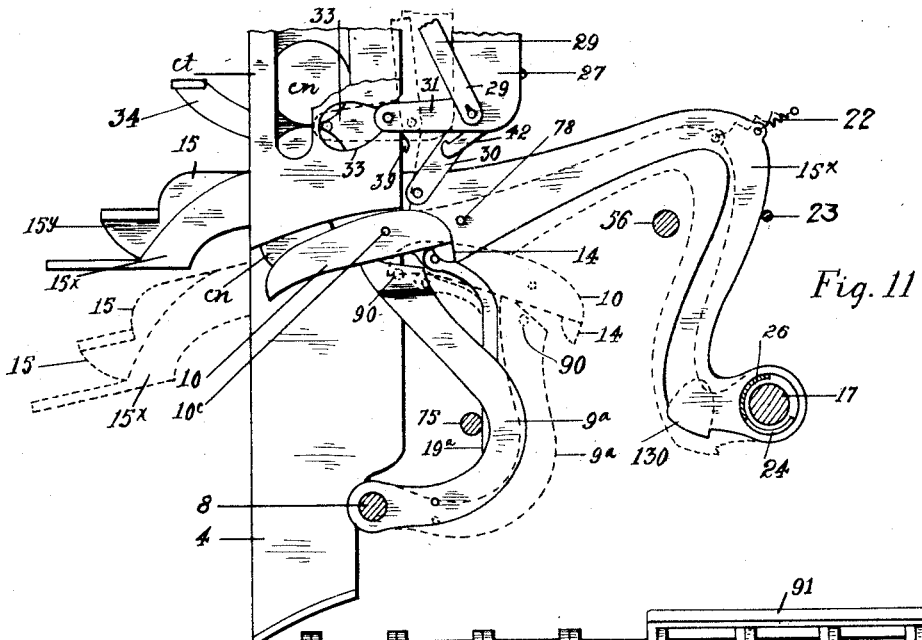
Fig. 11
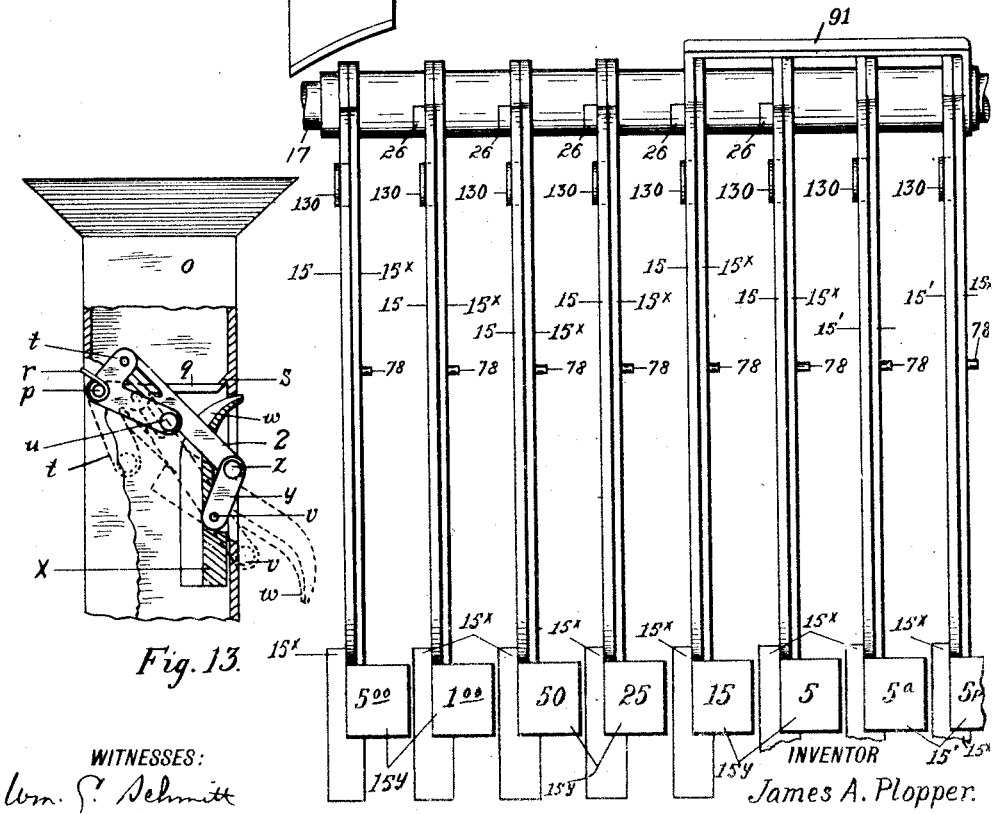
Fig. 13.
Fig. 12.
WITNESSES:
Wm. F. Schmitt
Cecil Long
INVENTOR
James A. Plopper.
BY
H. J. Geisler
ATTORNEY

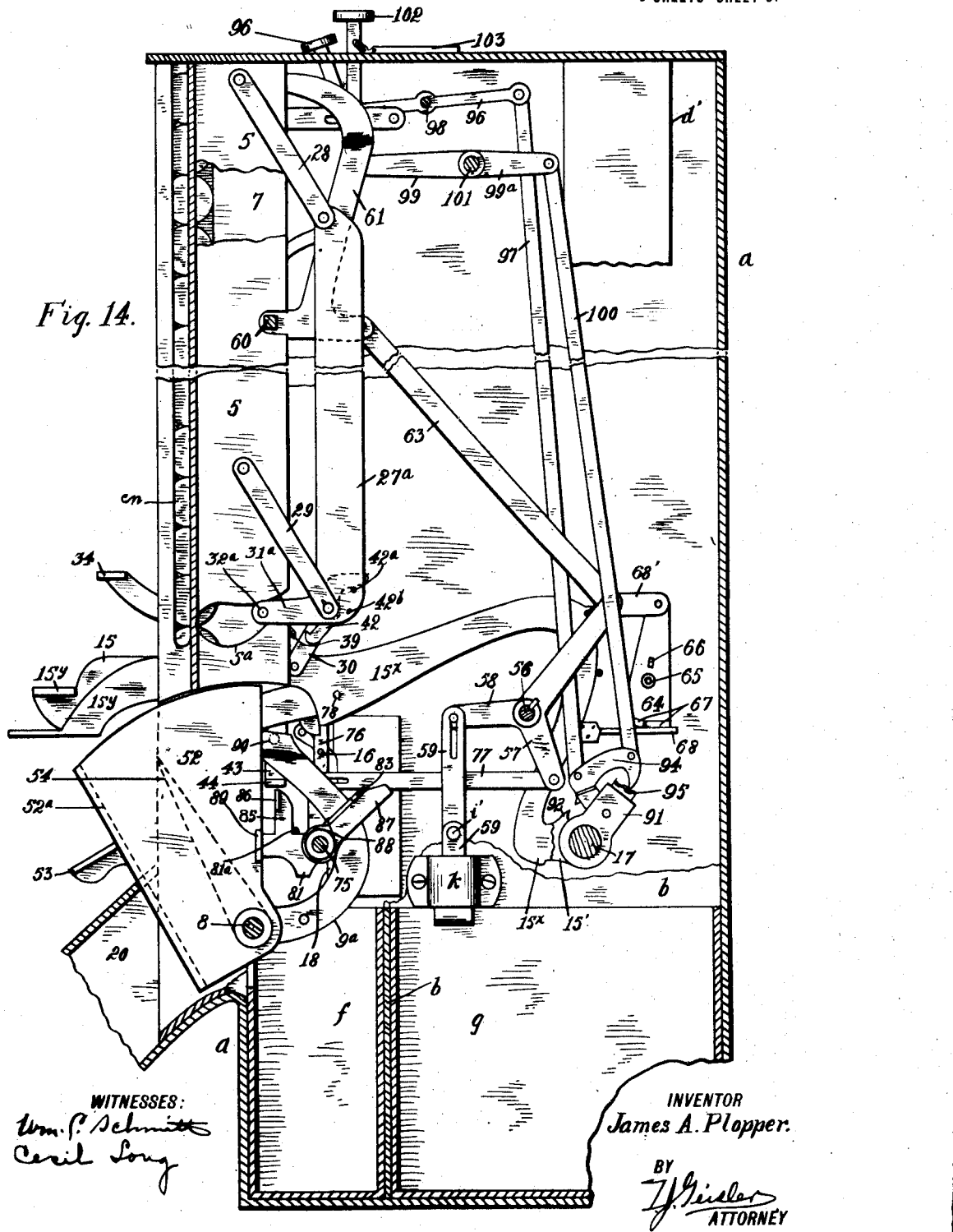

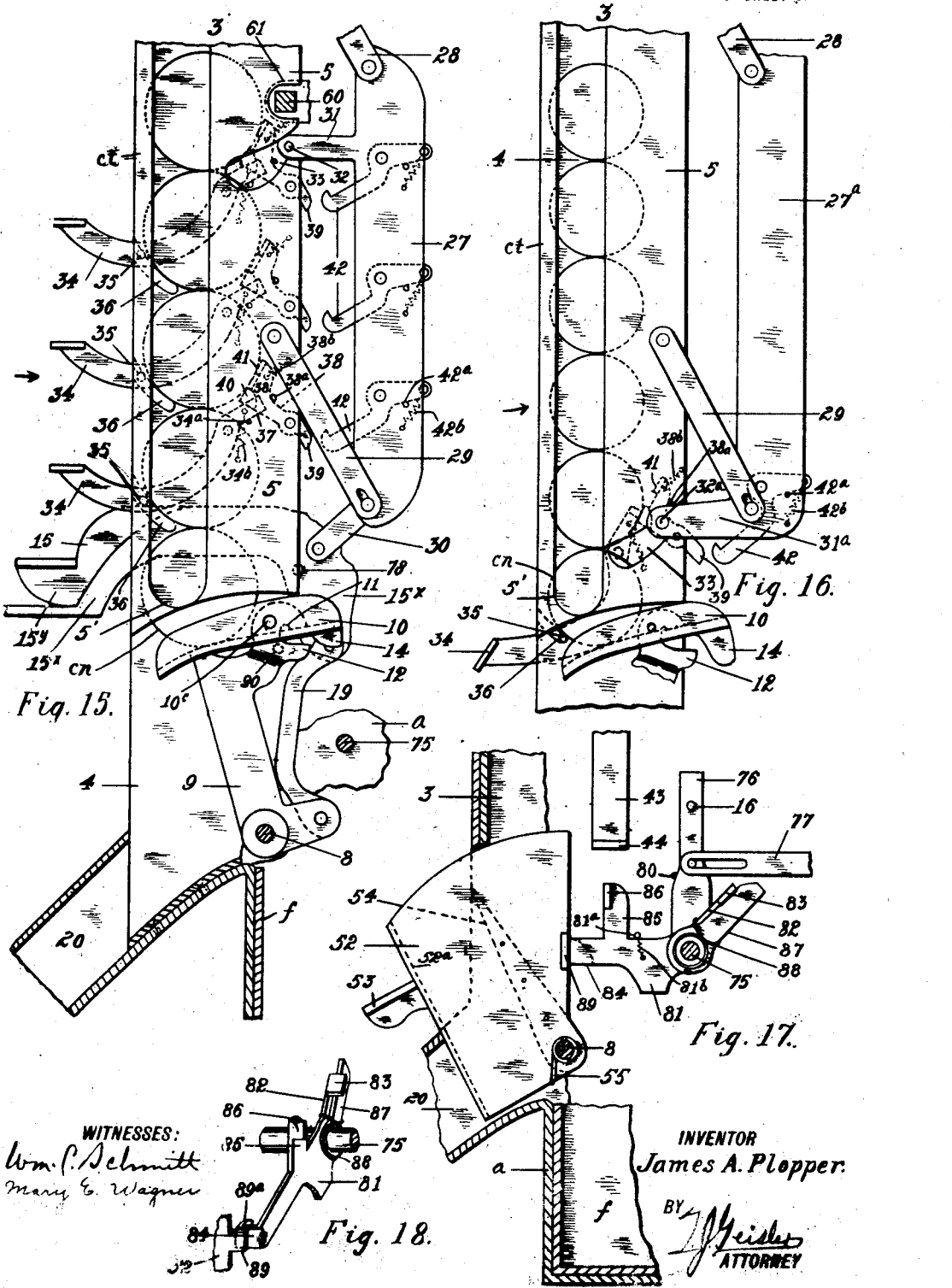

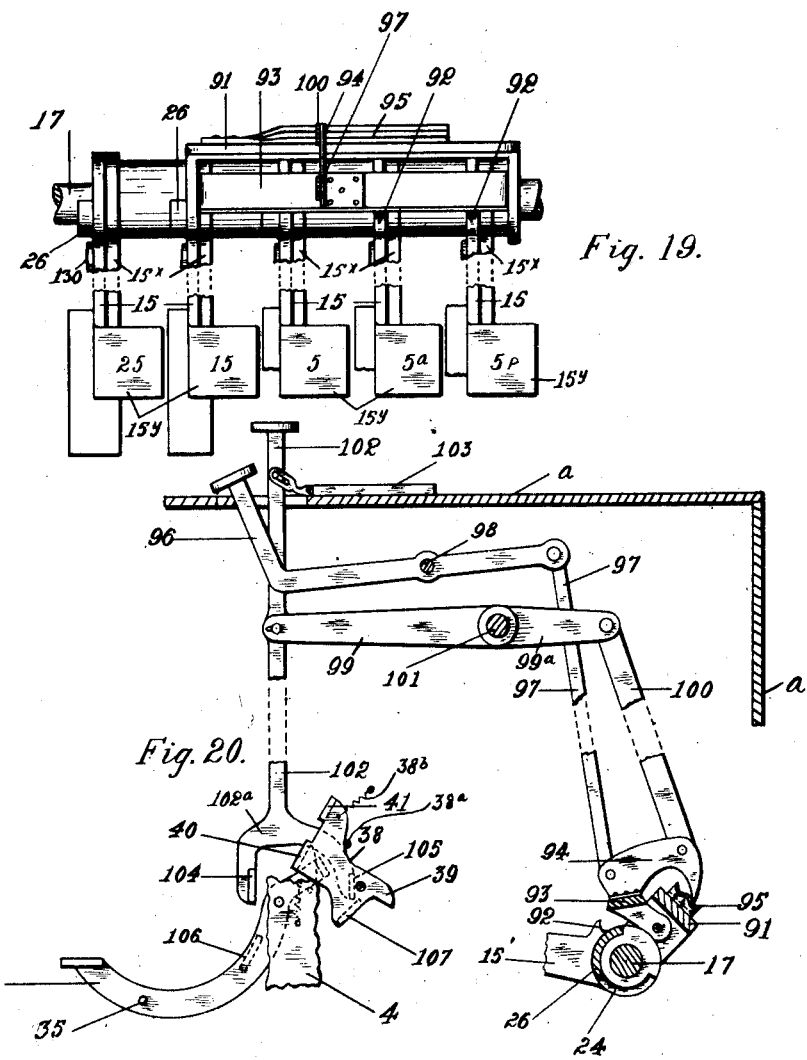

WITNESSES:

INVENTOR
James A. Plopper.
BY
ATTORNEY

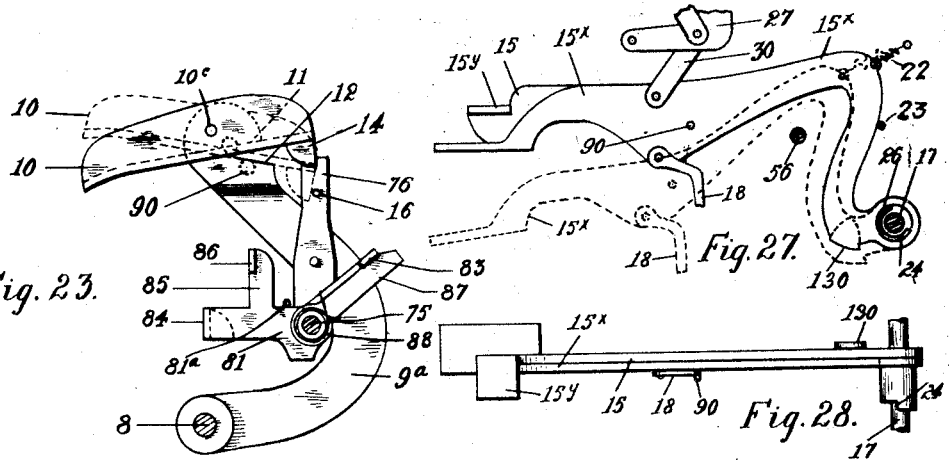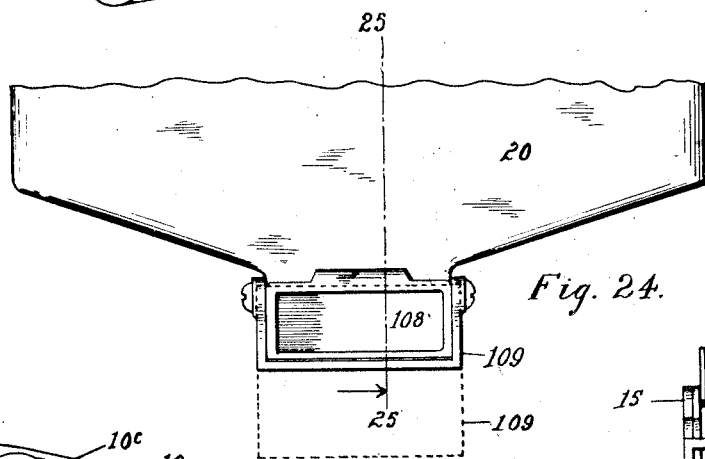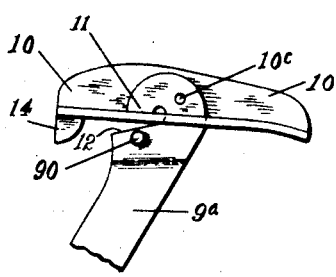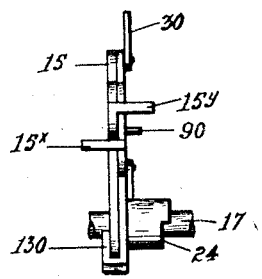

UNITED STATES PATENT OFFICE.

JAMES A. PLOPPER, OF PORTLAND, OREGON.

CHANGE-MAKING MACHINE.

1,194,316.   Specification of Letters Patent.   Patented Aug. 8, 1916.

Application filed October 1, 1913. Serial No. 792,893.

*To all whom it may concern:*

Be it known that I, JAMES A. PLOPPER, a citizen of the United States, and a resident of the city of Portland, county of Multnomah, State of Oregon, have invented a new and useful Improvement in Change-Making Machines, of which the following is a specification.

My invention relates to change making machines and has for its main object the providing of a machine for use in "pay as you enter" street cars or other common carriers, in order to facilitate the collection of fares and, further, the incorporating of mechanism in such machine by which is mechanically returned the correct change to which the passenger may be entitled.

It is further my object to provide a machine which is adapted to be used in three different ways: first, to deliver change aggregating the sum indicated by the operated pay-key; second, to make automatic subtraction from the coin tendered by withholding in the machine, and accumulating in individual coin-tubes, a predetermined part of the sum represented by such coin, and paying out the balance from the machine; and third, to deliver a portion of the change into a fare-till contained in the machine, and pay out the balance from the machine.

Figure 1:
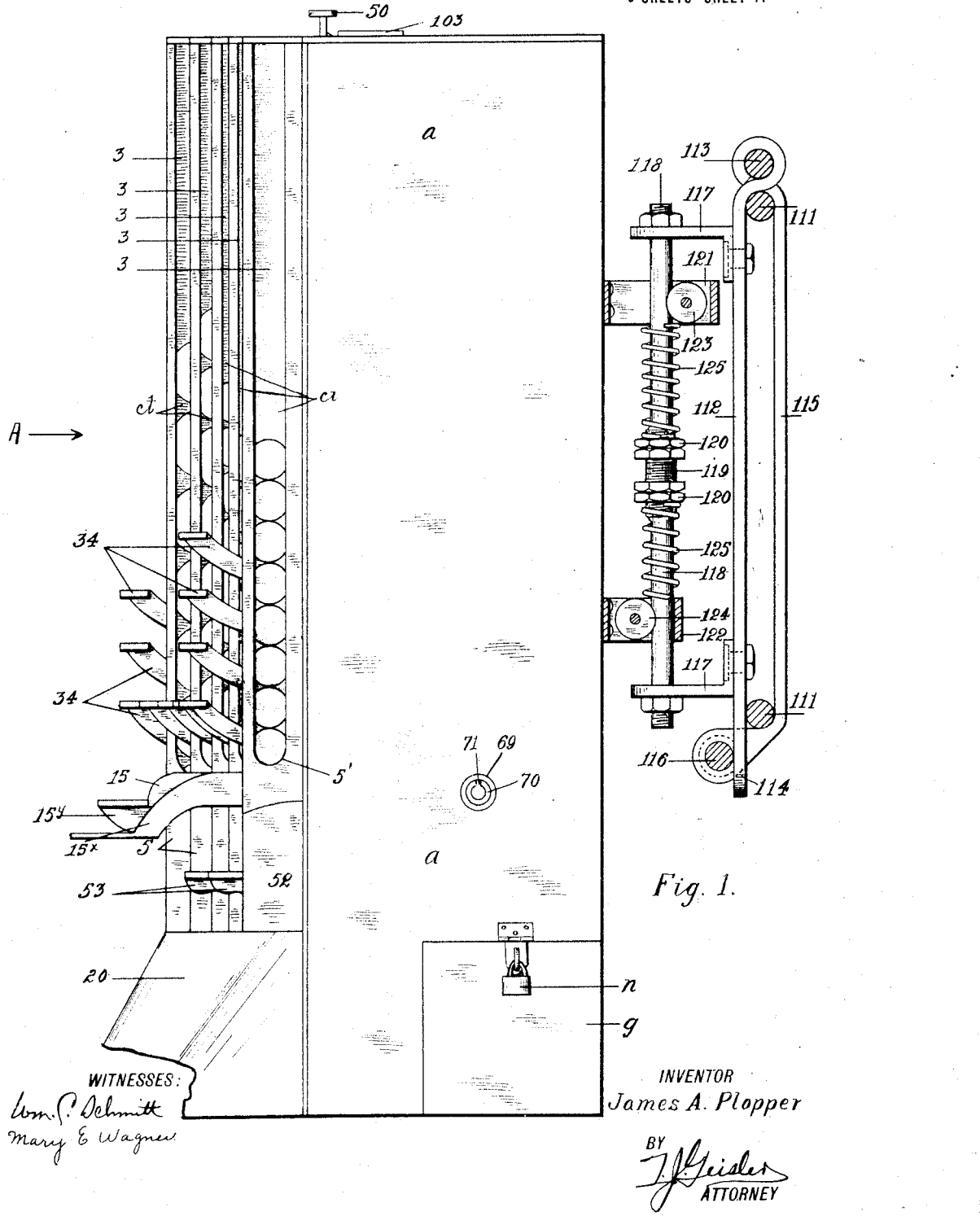
Figure 21:
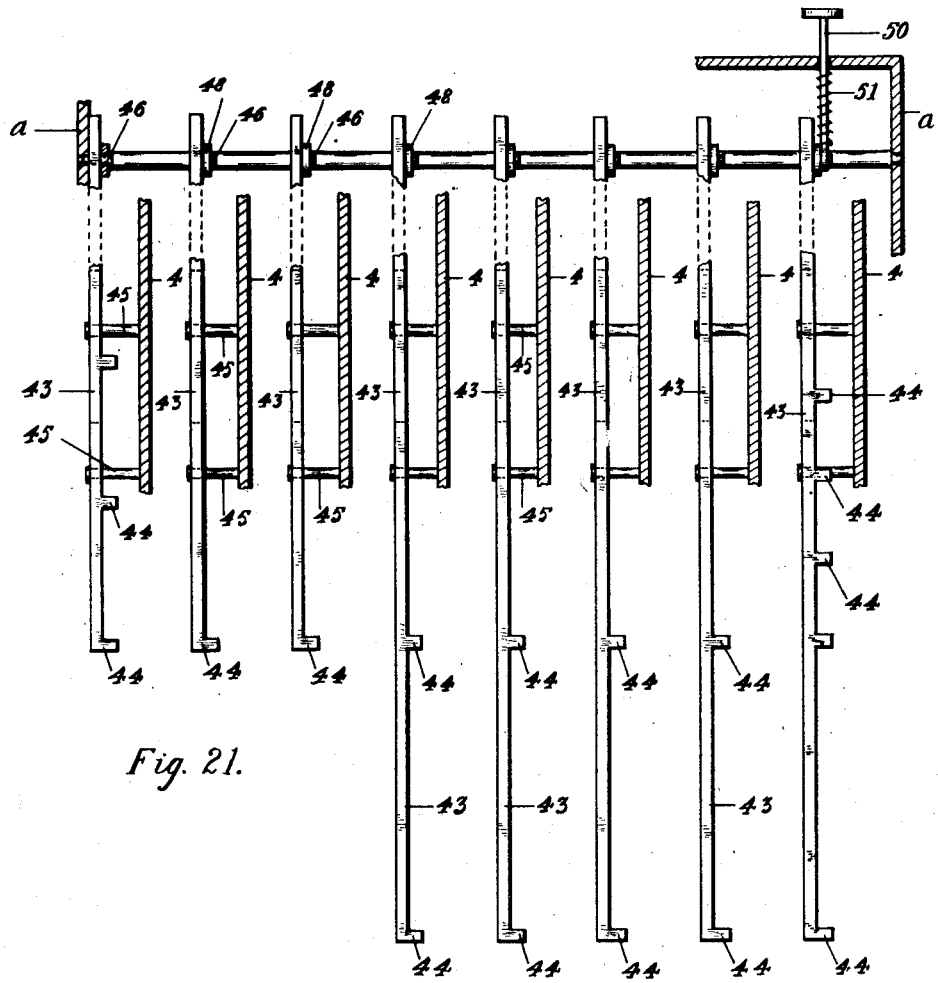
Figures 22, 22A:
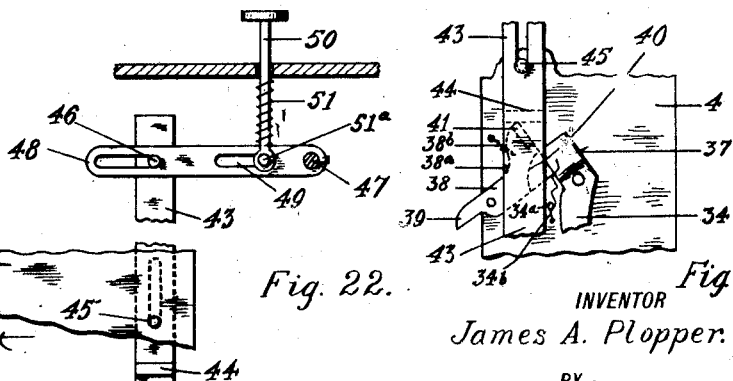

In the accompanying drawings: Figure 1 is a right end elevation of my machine, a portion of the delivery spout being broken away, and the supporting means being shown in section; Fig. 2 is a plan view of my machine with a portion of the cover plate broken away and certain parts of the interior mechanism omitted for the purpose of clearness; the view is here taken in the direction pointed by the arrow A in Fig. 1; Fig. 3 is a horizontal sectional view showing one of the individual coin tubes and a part of the key mechanism for paying out and deducting coins contained in the coin tube; Figs. 4, 5, and 5ª show details of construction, the first two showing side elevations and the last a top view; Fig. 6 is a partial vertical section of the case of the machine taken approximately on the line 6—6 of Fig. 2; this view illustrates the construction and operation of the means by which the tills are locked in place; Fig. 7 is a detail in end elevation of the mechanism by which the various parts of the device may be locked against operation; Fig. 8 is a plan of the key used in connection with the parts shown in Fig. 7; Fig. 9 is a side elevation of the key shown in Fig. 8; Fig. 10 is a sectional side elevation of a detail shown in Fig. 7; Fig. 11 is a right-end elevation showing a detail of the construction and operation of the gate controlling the outlets of a coin-tube, also of the pay-key, and deducting key mechanisms; Fig. 12 is a plan showing how all the pay keys are connected so as to operate simultaneously all the pay-keys of the lower coin denomination than the key operated; Fig. 13 is a sectional detail of the means provided in the inlet coin chute for examining the coin deposited, and returning the same if required; Fig. 14 is a general sectional view of my machine; Fig. 15 is a detail in side elevation of the dollar coin tube, showing its pay key and deducting key mechanism and coin gate; the parts are shown in their normal positions, *i. e.*, ready for operation. The bearing portion of the frame of the machine on which the pay key is pivoted is not shown in this view; Fig. 16 is a similar detail in side elevation of the half-dollar coin tube, and its operating parts; in this view the deducting mechanism is shown as having been operated; Fig. 17 is a sectional view showing a detail of the mechanism by which a coin may be switched from a coin tube into either the fare-till or through the delivery chute; such switch is preferably provided only in the penny, nickel and dime coin-tubes; Fig. 18 is a perspective view of parts shown in Fig. 17; Fig. 19 is a detail of the shifting mechanism for throwing the penny and one nickel ejecting devices into operative state; Fig. 20 is a side elevation of the same mechanism, showing in addition the automatic deducting means for throwing one of the dime ejecting mechanisms into inoperative state whenever the shifting mechanism has been actuated to throw the nickel and penny ejecting mechanism into inoperative state; Figs. 21, 22, 22ª are details of supplemental releasing mechanism; Fig. 23 is a detail of the gate controlling the outlet of a coin tube; the broken lines of this figure show the gate as automatically tilted into locked position when not having any coin bearing on it; Figs. 24 and 25 show, respectively, a front elevation and a section of the delivery spout and the weighted gate hinged thereon; Fig. 26 is a further detail of one of the gates of the coin-tubes; and Figs. 27, 28 and 29 show details of construction and operation of pay-keys made of main and auxiliary members, in order to provide for the paying out of an individual coin if desired.

My machine is furthermore so contrived that in all cases the change may be so made that the coin of lowest denomination will be either a nickel or penny; and at any time when a coin required to complete the amount of change is not forthcoming, the machine will automatically lock itself against operation until such coin is provided.

To the same end my machine, among others, embodies further the following important features, viz:

A system of key-actuated mechanism whereby the correct change is made and delivered from the machine; key-controlled mechanism for locking all parts against operation when the machine is not to be used; mechanism which may be operated to shunt coins from the individual coin tubes either into the fare till or the delivery chute; mechanism which will permit the operator to inspect all coins and tickets deposited in the fare chute, and to throw out those which are incorrect; and a supporting means by which my machine may be resiliently, yet securely, mounted on the cross-bars of a supporting frame.

I shall illustrate and describe my invention as designed for use in a "pay as you enter" street car.

The case, $a$, of my machine is made with an angular partition $b$, providing till spaces $f'$, $g'$, see Fig. 2. In the top of this case are a number of coin slots, $c$, $d$, $e$, of which the slots $c$ constitute the inlets to a series of individual vertical coin tubes $ct$; the slot $d$ constitutes an inlet to the tube $d'$ which discharges into a "fare-till" $f$ (see Fig. 6) contained in the space $f'$, and the slot $e$ constitutes an inlet to a tube $e'$, which discharges directly into another and smaller "conductor's till" $g$, contained in the space $g'$. The conductor's till $g$ is confined within the corner partition $b$ and the fare till takes up the remaining portion of the bottom of the case. The object in having two tills is to provide a special till for the conductor in which he deposits his personal change, reports, etc., segregated from the company's effects. In Figs. 6 and 7 is shown a convenient means whereby these tills are automatically locked in place in the machine, when pushed into the case, and may be unlocked only by the use of a specially made key. See Figs. 8 and 9. To this end the corner partition $b$ is provided on opposite sides (see Figs. 6 and 7) with fixed leaf springs $h$, and a pair of bolts $i$, located on opposite sides of the partition $b$, are normally projected into engagement with the tills $f$ and $g$ by the coil-springs $j$. See Fig. 6.

The pawls $i$ are connected by a pin $i'$ vertically movable in the slot $i^2$ of the partition $b$. The coil-springs $j$ are restrained within the housings $k$, which are riveted to opposite sides of the partition $b$. The lower ends of the bolts are made with beveled heads, and when either of the tills is pushed back into the case, said bolts will ride up and snap over the ends of such till, and thus lock the latter against being pulled out until the bolt holding it is withdrawn. When the latter action has taken place, the leaf springs $h$, which will have been compressed by the inward thrust of the tills, will expand and push the tills outwardly far enough so that they may be easily withdrawn.

As individual locking means, I have provided the locks $m$ and $n$ for the fare till and conductor's till respectively (see Fig. 6), the keys to these locks being kept by the company's representative and the conductor, so that neither one will have access to the till of the other.

The mechanism for raising the bolts $i$ also controls certain other parts not yet described, so the details of such mechanism will again be hereinafter referred to.

On the left end of the case, $a$, is fixed a fare-hopper $o$, provided at its lower portion with a delivery chute $o'$ (see Figs. 2, 6 and 14), which is inclined inwardly through the end wall of the case and is adapted to discharge the fare into the fare till $f$. A shaft $p$ is journaled in the side walls of the fare-hopper $o$, and rigidly holds an exhibiting plate $q$. See Fig. 13. A spring $r$ normally holds said plate $q$ against a stop $s$. The bell-crank $t$ is rigid on the projecting end of the shaft $p$, and has a small crank handle $u$. A shaft $v$, also journaled in the hopper $o$, has fixed on it an expelling member $w$, having a weighted end $x$ adapted to hold said chute normally in vertical position as shown in Fig. 13. The shaft $v$ has rigidly fixed on its projecting end an arm $y$, made with a crank-handle $z$. A slotted link 2 operatively connects the bell-crank $t$ and the arm $y$. The sides of the hopper are made of transparent material, thus exposing the fare deposited in the hopper to view. If the operator is satisfied that the fare deposited is right, he will operate the handle $u$, thus rotating the shaft $p$, tilting the plate $q$ and causing the fare to be discharged into the fare chute $o'$ and thence into the fare till $f$. If the coin deposited is not all right, the operator will return it by seizing the crank-handle $z$ and these devices to cause the dropping of the coin from the plate $q$ onto the expelling chute $w$, which being positioned as shown in dotted lines in Fig. 13, throws the coin out.

The front of the case, $a$, is provided with a series of parallel, vertically extending, individual coin-tubes 3, adapted to receive coins of different denominations, for example as indicated on the black keys of Fig. 2. The structure of these tubes is shown in Figs. 3, 7, 15 and 16. They consist of parallel sides 4 and 5, spaced apart by an intermediate plate 7, having a thickness slightly greater than that of the coin to be inserted in the tube, and leaving a space at the front of the tube slightly greater than the diameter of the coin to be contained in the latter. A portion of the plate 5 is cut away as shown at 5' in Figs. 15, 16, so that the number of coins contained in a tube at any time may be observed by the operator.

A shaft 8 is fixed in the end walls of the case $a$ and rotatably mounted on this shaft are lever-like arms 9 one for each coin tube. See Figs. 15, 16 and 23. To the upper end of each of such arms is pivoted a coin-gate 10, so positioned as to lie across and control the discharge end plane of the coin tube and operating to hold the coins therein until the gate is moved out of the way. The upper end of the arm 9 extends through the slot $10^a$ of the horizontal piece $10^b$ of the gate 10, as shown in Fig. 26. The gate 10 has limited movement on its pivot $10^c$ between the stop-lugs 11 and 12, integral parts of the arm 9 (see Fig. 26). Furthermore the rear end of the coin-gate is weighted, as at 14, so that when there is no coin in the tube, it will be tilted to the position shown in the broken lines of Fig. 23. This construction provides for the automatic locking of the coin tube mechanism when the coin-tube is empty; such operation will be hereinafter explained.

The arm $9^a$ seen in Fig. 23 and the arm 15, seen in Fig. 11, are made curved as shown in order to avoid other parts.

The arm 9 will be rocked clockwise by the operation of the pay-key 15, thereby moving the coin-gate 10 away from the discharge end of the coin-tubes, and permitting one or more of the latter to drop out by gravity. The number of coins so discharged will depend upon the preceding operation of the coin restraining or deducting devices hereinafter described. But if there is no coin in the tube, then the gate 10 will be tilted by its weight 14 to the position shown in broken lines of Fig. 23, and its weighted end will strike a stop-pin 16, projecting from the upright bar 76 and in so doing lock the pay key 15 against actuation.

A series of upright bars as 76 are provided on the rotatable shaft 75, and will hereinafter be again referred to and more fully described. Each arm 9 is connected to the corresponding pay-key 15 by a link like 18 or 19, as shown in Figs. 11 and 15. The form of these links is merely adopted as convenient to avoid other parts. Thus for the pay-keys controlling the penny, nickel and dime tubes, a link formed like 18 and for the remaining pay-keys a link formed like 19 is used.

The action of all pay-keys is alike, hence the description of one action will be sufficient. I will describe the action of the dollar pay-key by the aid of Fig. 15 and Fig. 11, the former representing the parts appearing before the pay-key is operated and the latter showing in broken lines the position of the parts after such operation. When this pay-key 15 is depressed, the related arm 9, being connected with the key by link 19, will be partially rotated, moving the gate 10 away, and the coins contained in the tube not restrained by the deducting mechanism will drop through, out of the chute 20. Springs 22 normally hold the pay-keys against the stop-bar 23. The total value of the coin or coins ejected from the machine will equal the amount marked on the finger piece of the pay-lever depressed, less whatever deductions have been made by the operation of the deducting mechanism.

The series of pay-keys 15 are connected as detailed in Figs. 12, and 19, so as to act in unity in certain operations. To this end the adjacent pay-keys have clutch-like engagement. That is, the key shank $15^a$ is made with hub having a portion cut away, as shown at 24 in Fig. 11, extending two thirds around the hub and forming a bearing for a projecting portion 26 of the hub of the adjacent pay-key. As shown in Fig. 11, the projection 26 is adapted to permit the pay-keys some independent rotary movement, but as shown in Figs. 11 and 12, when any key is depressed all pay-keys located to the right thereof will also be operated. A different construction, however, controls the nickel and penny mechanism, hereinafter described.

The normal operation of my coin discharging mechanism is so contrived as to discharge in one action four dollars from the dollar tube, five pennies from the penny tube, and single coins from the remaining tubes. The devices so operating the dollar coin-tube are shown in Figs. 15 and 11. Swinging bars 27 are pivotally supported by links 28 and 29 on the coin-tube 5, and are connected to the pay-keys 15 by the links 30. See Fig. 15.

The link 29 is slotted at its lower end, and a projecting arm 31 of the bar 27 has a laterally projecting pin 32, moving in the space 33 cut out of the coin-tube. When the bar 27 is moved forward the pin 32 will be moved under and hold the fifth dollar from the bottom. In other coin-tubes, except that of pennies, the pin 32 will be moved under and hold the second coin from the bottom. In the penny tube the pin will hold the sixth penny from the bottom. By reason of the link 29 being slotted the pin 32 will furthermore ride on the coin below it, and impose the weight of the bar 27 thereon; and in so doing the pin 32 will help to eject the coin or coins below it.

The connections between the coin gate 10, pay-key 15 and bar 27 are shown on a large scale in Fig. 11; these connections are made in such manner that when the pay-key is depressed, the bar 27 will be swung forward to its coin restraining position before the gate 10 is rocked forward sufficiently to release the coin; and so that the gate will be returned to its normal coin-supporting position before the bar 27 releases the restrained coin.

The mechanism shown in Fig. 16 is similar to that shown in Figs. 15 and 15$^a$, only the arm 31$^a$ carried by the bar 27$^a$ is differently located, as required for its work. The coins in the views are designated by $cn$.

In case a certain amount is to be deducted from the change, coins equivalent to that amount may be held back by the depression of the deducting keys 34, representing in value the amount to be so held back. See Figs. 1, 15 and 16. The deducting keys 34 are fulcrumed on pins 35 between the sides of the coin tube and are normally held against stop-pins 34$^a$ by springs 34$^b$.

Pins 35 are provided on the deducting keys 34, which pins move in the space 36 cut out of the sides of the coin tube. When a deducting key is operated the pin mentioned will be moved under a coin and thereby hold the latter and overlying coins from being discharged. The inner ends of each deducting key 34 are formed with a lateral toe 37 (see Figs. 3, 4, 5 and 5$^a$) and a coöperating detent 38 is pivoted adjacent such toe, being normally held against a stop pin 38$^a$ by a spring 38$^b$. Each of the detents 38 is made with a rearwardly extending finger 39 and a laterally extending hook-shaped arm 40 rounded off. See Figs. 3, 4 and 5. A lateral toe 41 is also formed on the upper portion of the pawl.

Normally the toe 37 of a deducting key will overlie the arm 40 of the detent (see Fig. 4); but when the deducting key is depressed the toe 37 will be moved over the arm 40, thereby temporarily depressing the pawl. When the toe 37 has moved entirely over the pawl, these parts will be positioned as shown in Fig. 5 and lock the deducting key in depressed position. When the pawl 38 is rocked clockwise, to break its locking engagement, the deducting key 34 will resume its normal position. A trip 42 for each detent 38 is pivoted on the movable bar 27, and is normally held against a stop-pin 42$^a$ by a spring 42$^b$. When the bar 27 is actuated as mentioned the latch 42 will be moved under the finger 39 of the pawl 38 and when the bar 27 is returned to its normal position it will cause the trip 42 to engage with said finger 39 and trip the detent 38, thereby releasing all previously operated deducting keys. I also provide supplementary releasing means, shown in Figs. 21, 22 and 22$^a$, whereby the depressed deducting keys may be released independently of the pay-keys. These bars are made with lateral toes 44 which overlie the lateral toes 41 of the pawls 38. For this purpose slotted bars 43 are mounted vertically slidable on pins 45. The upper ends of said bars have projecting pins 46 bearing in a slotted arm 48 pivoted on a shaft 47 journaled in the case $a$.

One of the arms 48 (see Fig. 22) is also made with a slot 49 in which bears a pin 51$^a$ of the releasing key 50. Said key is held normally up by the spring 51 and when depressed will move downward all the bars 43, thereby causing the toes 44 of such bars to bear on the detents 38 and operating the latter to release the deducting keys, which are then returned to their normal or initial positions by the springs 34$^b$.

The dollar, half-dollar and quarter-dollar coin-tubes are adapted to discharge directly into the delivery chute 20, as shown in Fig. 15, but the remaining coin-tubes are provided with shunt-switches 54, which may be positioned so as to divert the coins released from the coin-tubes into the fare-till $f$. This feature is detailed in Figs. 14 and 17. A switch-plate 52 is rotatably mounted on the shaft 8, in the coin-tube. The plate 52 is controlled by a spring 55, and has a finger-piece 53. Said plate further has a perpendicular flange 52$^a$ which normally forms a closure for a cut-out portion in the front wall of the coin-tube 3. Laterally projecting from the plate 52 is a switch 54, which may be so positioned by pressing on the finger-piece 53 as to discharge the released coins into the fare-till $f$ instead of out of the chute 20.

I shall now describe the devices for raising the snap bolts $i$, and also for locking the parts of the machine against being operated. A shaft 56 (see Fig. 7) is journaled in the ends of the case $a$. Keyed on this shaft is a series of crank-arms 57, of which the one located nearest the left side of the partition $b$ is made in the form of a bell-crank 58. A slotted link 59 connects the pin $i'$ with the bell-crank 58, so that when the latter is rotated clockwise, the snap-bolts $i$ will be drawn upward, but the bell-crank 57 may be rotated counter-clockwise without affecting said bolts. A rotatable shaft 60, journaled in the ends of the case, extends back of the coin-tubes and bears a plurality of rigid hooks 61, each having a bill adapted to be inserted through an opening 62 at the top of the intermediate plates 7 of the coin-tube, and when the shaft 60 is rotated to the left said bills will enter the coin-tubes and bar the extraction of coins therefrom. Links 63 connect crank-arm 57 with the hooks 61.

On the left end wall of the case, $a$, is pivoted at 65 a keeper 64 (see Figs. 7 and 10) and lateral toes 67, disposed at an angle to each other. A spring 68 is arranged to bear against one or the other of the toes 67 and thus hold the keeper 64 in either of its two positions. A link 68' connects the upper end of the keeper 64 with the crank arm 57 and the link 63; these parts forming a toggle-joint. Thus all the hooks 61 may be thrown into their locking position, and withdrawn again by the rotation of said keeper 64. The means for rotating said keeper 64 consist of a tubular bearing 69 arranged as shown in Figs. 1 and 6. In this bearing 69 is journaled a tubular shaft 70 made with a key-slot 71, adapted to receive the bit 73 of a key 72. See Figs. 8 and 9. The end of the key 72 is recessed at 74 for the lug 66 of the keeper 64. The bit of the key prevents the withdrawal of the latter until the shaft 56 has been rotated into position to operate said locking devices of the machine.

The bars 76 are connected to the bell-crank 57 by slotted links 77. Spring 79 normally holds the bars 76 against a stop-pin 80, as shown in Figs. 7 and 17. When the keeper 64 is rotated to operate said locking means the bars 76 will be rotated clockwise until the upper ends of said bars lie in the paths of motion of the laterally projecting pins 78 of the pay-keys 15 (see Figs. 11 and 15), thereby locking said pay-keys against actuation.

It will be seen from Fig. 7 that a clockwise rotation of the keeper 64 will operate the snap-bolts $i$ and release the tills. Rotatable on the shaft 75 (see Figs. 17, 18 and 23) is an arm 81 normally held by a spring 88 against a stop-pin 81ª, projecting from a frame member. Said arm has a rearwardly projecting piece 82 (see Fig. 18) made with a lateral toe 83. The forward end of the arm 81 is made with a hook 84 the portion 89ª of which is rounded off. An upright piece 85 of the arm 81 is made with a lateral toe 86. Also rotatably mounted on the shaft 75, adjacent the arm 81 is a companion arm 87, which is held up against the lateral toe 83, of the arm 81, by a spring 88; see Fig. 17. The rear of the switch-plate 52 is made with a lateral lug 89. The switch-plate 52 may be moved to its position in Fig. 17 by pressing on the finger piece 53. During such movement the lateral toe 89 will pass over the hook 84 of the arm 81, but after having passed the hook 84 the plate 52 is held by the latter against return movement, as shown in Fig. 17. When a pay-key 15 is depressed, thereby locking the arm 9 (or 9ª) to the right (as shown in Figs. 11 and 15), the pin 90 on said arm 9 will depress and pass over the arm 87, and the return movement of said arm 9 will cause the pin 90 to bear up against the under side of the arm 87, in so doing rotating the arm 81 away from the lug 89 of the switch-plate 52, and permitting the latter to assume its normal position. In the complete return movement of the arm 9 its pin 90 will pass over the arm 87 and permit the arm 81 to resume its normal position. As mentioned above, switches are not provided in connection with the dollar, half-dollar and quarter-dollar tubes. As an auxiliary releasing means for the switch-plate 52 the lower toes 44 of the depressible bars 43 are arranged to overlie the lugs 86 of the arm 81 so that the latter will be released synchronously with the detents 38 when the key 50 is depressed.

I have so far described the machine as used when no pennies are to be included in the change. However, it frequently happens that "three-cent" fares are taken and to provide for such circumstances I have incorporated in my machine auxiliary mechanism shown in Figs. 19 and 20 which, when actuated, will throw one of the dime ejecting mechanisms into inoperative state, and place into operative state one of the nickel and penny ejecting mechanisms. The latter and operating connections are arranged to make them normally inoperative, and to require an action on the part of the operator to place them in their operative state. The reason for this is that when, for example, a nickel and five pennies is wanted, to be included in change for more than a dime, the latter must be held back by the deducting mechanism controlling the coin-tube thereof. The penny mechanism is adapted to eject from one to five pennies, deductions being made by mechanism the equivalent of that provided for dollars. The penny and the two nickel pay-keys marked 5, 5ª and 5ᵖ in Figs. 2 and 19 are adapted to be operated independently of each other; there being no interlocking connection between these three keys. See Fig. 19. But the pay-key marked 15 pays out fifteen cents, viz: a dime and a nickel. Such key is made with a U-shaped piece 91 (see Figs. 19 and 20) rotatably mounted on the pay-key shaft 17. The penny pay-key 5ᵖ and adjacent nickel pay-key 5ª are each made with a lug 92. A bail 93, pivotally mounted on the ends of said extension 91 of the fifteen cents pay-key, is adapted to be thrown into and out of engagement with the lugs 92. When in engagement, the penny and the two nickel pay-keys will be interlocked with the fifteen cents pay-key. The bail 93 has a dog 94, and the extension 91 of the fifteen cents pay-key is provided with a leaf spring 95, made with two longitudinal grooves in each of which the nose of the dog 94 may become seated, thereby holding the arm 93 either in or out of engagement with the lugs 92. One end of the dog 94 is connected to the shift-key 96 by a link 97, said shift-key being fulcrumed on a stud 98 on the partition $b$. When the key 96 is actuated the bail 93 will be moved out of engagement with the lugs 92. The other end of the dog 94 is connected to the shift-key 102 by a link 100 and an arm 99 fulcrumed on a stud 101 on the partition $b$. An indicator plate 103 (see Fig. 2) is so connected to the shift key 102 that when the latter is depressed said indicator plate will be raised on its hinge, thereby indicating to the operator that the penny mechanism has been placed in operative state.

When the penny and adjacent nickel discharging mechanism is thrown into action the deducting mechanism of the adjacent dime coin-tube is simultaneously actuated as follows: The shift-key 102 is extended downward and made with a bifurcated end 102$^a$ the members of which are provided with lateral lugs 104 and 105. The lug 104 overlies a lug 106 on the deducting key 34 (marked 10. on black surface in Fig. 2) and the lug 105 overlies a lug 107 provided on the detent 38. See Fig. 20. Thus when the shift-key 102. is depressed, the lug 105 will first bear on the lug 107 and rock the detent 38, and then the lug 104 will bear on the lug 106 of said dime deducting key 34 and depress the latter, consequently the machine will discharge a nickel and five pennies instead of a dime. The rocking of the detent 38, as apparent, will prevent said dime deducting key from being locked in its depressed position when the shift key 96 has been depressed. These devices are so arranged that when the shift key 96 is actuated said dime deducting mechanism will again be placed in its normal or inactive state. In other words, when the key 96 is depressed the dog 94 will be positioned to permit the operation of the dime discharging mechanism, and simultaneously to disconnect the penny and adjacent nickel discharging mechanism by lifting the key 102, in so doing restoring the time deducting mechanism and making the dime mechanism normally operable.

The discharge end 108 of the delivery chute 20 pivotally holds a weighted gate 109 (see Figs. 24 and 25), which normally closes by gravity and constitutes a coin cup for temporarily holding the expelled coin. The gate is provided with a finger piece 110, to be engaged by the fingers and thrust into position, thereby depositing the coins in the hand.

In Figs. 1 and 2 I have shown a convenient way in which my machine may be readily attached to and detached from its support. The construction shown embodies resilient bearings for taking up the shocks and jars to which the car might be subjected. The usual position of the conductor in a "pay as you enter" car is on the rear platform. A barred window enables him to view the interior of the car, and it is on the bars of this window that I propose to support my machine. 111 represent window bars.

A pair of parallel flat bars 112 (see Figs. 1 and 2) are hinged at their upper ends on a rod 113, and their lower ends are slotted, as shown at 114 in Fig. 1. Latch bars 115 are also hinged on the bar 113, and the lower ends of the bars 115 being inserted through slots provided in the bars 112. A rod 116 is inserted through holes in the latch ends of the latch bars 115, and rod 116 may be fastened in place by some convenient form of locking means, for the purpose of locking my machine in place. Fastened on the bars 112 are brackets 117. A rod 118, made with a medial threaded portion 119 is supported by the brackets 117, and locknuts 120 are adjustable on said threaded portion. See Fig. 1.

The back of the case of the machine is provided with ears 121, 122, having journaled in them sheaves 123, 124, respectively. Said sheaves bear on the rod 118, and tend to hold the machine in a vertical position. Compression springs 125 are placed as shown in Fig. 1 and constitute shock absorbing means; the upper springs resiliently support the machine, while the lower springs yieldingly retard its upward movement.

In order to be able to discharge individual coins from the coin-tubes, I construct the pay-keys of two parts 15 and 15$^x$, which for convenience may be designated the main part (15) and the auxiliary part (15$^x$). The latter is rotatably mounted on the hub of the main part, and the operative connections between the pay-key mechanism, the hold-back mechanism, and the deducting key mechanism of a coin unit are made with said auxiliary member 15$^x$. Depression of the latter merely operates, therefore, the devices of the particular unit; and in order to bring about coöperative action between the related coin units, the main part 15 of the pay-key must be depressed. This part has the coöperative clutch feature operatively connecting all keys to the right of the pay-key operated, as above described. The main part 15 has a finger portion 15$^y$ overlying the auxiliary part 15$^x$ (see Figs. 27, 28 and 29) so that the latter is operated by the former. The auxiliary part is held against lateral movement on the hub of the main part by means of the restraining arm 130.

I claim:

1. A machine of the character described comprising a coin-tube adapted for holding a column of coins edgewise and discharging by gravitation; pay-key mechanism; a gate operated by the latter controlling the outlet of the coin-tube; means locking the gate in place, such means adapted to be operated to release the gate when coin in the tube bears on the latter; means operated by the pay-key adapted to hold back the upper coin or coins of the column to be retained in the coin-tube, deducting key mechanism, including a member adapted to be inserted under the coin or coins to be held back when the pay-key mechanism is operated; means for temporarily locking the deducting mechanism against return movement when its key is released; other means adapted to release said locking means, such other means coöperatively connected with the pay-key mechanism and operated by the return movement of the latter.

2. A machine of the character described comprising a coin tube adapted for holding a column of coins edgewise and discharging by gravitation; pay-key mechanism; a gate operated by the latter controlling the outlet of the coin-tube; means locking the gate in place, such means adapted to be operated to release the gate when coin in the coin tube bears on the latter; means operated by the pay-key adapted to hold back the upper coin or coins of the column to be retained in the coin tube, and simultaneously impose a weight on the coin or coins to be discharged; deducting key mechanism, including a member adapted to be inserted under the coin or coins to be held back when the pay-key mechanism is operated; means for temporarily locking the deducting mechanism against return movement when its key is released; other means adapted to release said locking means, such other means coöperatively connected with the pay-key mechanism and operated by the return movement of the latter.

3. A machine of the character described comprising a coin-tube adapted for holding a column of coins edgewise and discharging by gravitation; pay-key mechanism; a gate operated by the latter controlling the outlet of the coin-tube; means locking the gate in place, such means adapted to be operated to release the gate when coin in the coin-tube bears on the latter; means operated by the pay-key adapted to hold back the upper coin or coins of the column to be retained in the coin tube, and simultaneously impose a weight on the coin or coins to be discharged; deducting key mechanism, including a member adapted to be inserted under the coin or coins to be held back when the pay-key mechanism is operated; means for temporarily locking the deducting mechanism against return movement when its key is released; other means adapted to release said locking means, such other means coöperatively connected with the pay-key mechanism and operated by the return movement of the latter; and means for operating said releasing means of the deducting mechanism independently of said pay-key mechanism.

4. In a machine of the character described, comprising a coin-tube adapted for holding a column of coins and discharging by gravitation, pay-key mechanism, a gate operated by the latter controlling the outlet of the coin-tube, means operated by the pay-key and operating to hold back the upper coin or coins of the column when the pay-key is operated; and also adapted to impose downward pressure on the coin or coins to be expelled.

5. In a machine of the character described, comprising a coin-tube adapted for holding a column and discharging by gravitation, pay-key mechanism, a gate operated by the latter controlling the outlet of the coin-tube, a movable bar provided with a projecting piece adapted for being inserted between two coins, and operative connections between said bar and the pay-key mechanism including a slotted link adapted to cause the weight of said bar to be imposed on the coin or coins to be discharged when said gate has been moved from the outlet of the coin-tube.

6. In a machine of the character described, the combination of a receiving coin chute provided with an auxiliary outlet, means for barring such outlet, which means are operable to shunt the coin through said outlet, means, located above said outlet, for arresting the passage of a coin down said chute, said arresting means being independently operable, and connections between said arresting means and said barring means adapted to operate the former in unison with the latter.

7. In a machine of the character described, the combination of a receiving coin chute, an exhibiting member movably supported therein, being normally positioned to arrest the passage of a coin down the coin chute and operable to drop the coin down the coin-chute, said coin-chute provided with an auxiliary outlet; a companion member located below said exhibiting member and normally positioned to bar said auxiliary outlet, but adapted to be so positioned as to receive the coin dropped from the exhibiting member and shunt the same through said auxiliary outlet; means for operating said exhibiting member and said companion member independently; and connections between the exhibiting member and the companion member adapted to operate the former in unison with the latter.

8. In a machine of the character described, the combination with a coin-tube; of a rotatable shaft, a hook arm mounted thereon adapted for being thrown across the top of said coin-tube; and key-controlled means for locking the said shaft against rotation.

9. In a machine of the character described, the combination with a coin-tube provided with a lateral aperture at the top: a rotatable shaft, a hook mounted thereon adapted for entering said aperture of the coin-tube; and key-controlled means for locking the said shaft against rotation.

10. In a machine of the character described, the combination of a coin-tube, a rotatable shaft, a locking member mounted thereon adapted for being thrown across the top of the coins contained in said coin-tube; a movable till in the machine; means for locking said till in place, such means also operatively connected to said shaft; and key-controlled means for locking said shaft against rotation.

11. In a machine of the character described, comprising a coin-tube having plural discharge openings, pay-key mechanism and a shunting switch located at the discharge end of the coin-tube and movable therein to shunt the released coin to either of said openings; of means adapted to hold the switch in place when operated, and connections between said pay-key mechanism and said switch-holding means, adapted to operate the latter to release the switch while the operated pay-key is making its return movement.

12. In a machine of the character described, a coin-tube having vertical and lateral discharge openings; a spring-controlled member pivoted in said coin-tube, the latter having a wall portion cut away, and said member having a wall portion normally constituting a closure for said cut-away opening; a switch on said pivoted member arranged normally parallel to the wall portion of the latter, whereby when said pivoted member is tilted, the switch will lie across the discharge opening of the coin-tube and divert the released coin to said lateral opening of the latter: a spring-controlled pivoted arm for holding the pivoted member in place when operated, and pay-key mechanism having means adapted to tilt said pivoted arm, whereby said holding means are thrown off while the operated pay-key is making its return movement.

13. In a machine of the character described coin-tubes adapted to discharge by gravitation; pay-key mechanism for greater and lesser coins; deducting key mechanism adapted to hold back a coin in the tube when the pay-key mechanism is operated; means for temporarily locking the deducting mechanism against return movement when its key is released; other means adapted to release said locking means, such other means coöperatively connected with the pay-key mechanism and operated by the return movement of the latter; a shift-key and means thereby operated adapted to connect the pay-key mechanism of the greater coin with that of the lesser; such means including other mechanism connected with and adapted to simultaneously operate said deducting key mechanism of the greater coin, also the releasing means of the temporarily locking means of said deducting key mechanism.

14. In a machine of the character described coin-tubes adapted to discharge by gravitation; pay-key mechanism for greater and lesser coins; deducting key mechanism adapted to hold back a coin in the coin-tube when the pay-key mechanism is operated; means for temporarily locking the deducting mechanism against return movement when its key is released; other means adapted to release said locking means, such other means coöperatively connected with the pay-key mechanism and operated by the return movement of the latter; a shift-key and means thereby operated adapted to connect the pay-key mechanism of the greater coin with that of the lesser; such means including other mechanism connected with and adapted to simultaneously operate said deducting key mechanism of the greater coin, also the releasing means of the temporarily locking means of said deducting key mechanism; an auxiliary shift key, and means thereby actuated adapted to reverse the first mentioned shift-key and said devices therewith connected.

15. In a machine of the character described coin-tubes adapted to discharge by gravitation; pay-key mechanism for greater and lesser coins; deducting key mechanism adapted to hold back a coin in the coin-tube when the pay-key mechanism is operated; a shift-key and means thereby operated adapted to connect the pay-key mechanism of the greater coin with that of the lesser; such means including other mechanism connected with and adapted to simultaneously operate said deducting key mechanism of the greater coin; an auxiliary shift key, and means thereby actuated adapted to reverse the first mentioned shift-key and devices therewith connected.

16. In a machine of the character described, a plurality of coin-tubes; a gate controlling the outlet of each coin-tube; pay-key mechanism operating such gates, each pay-key mechanism comprising main and auxiliary key members, the latter adapted to be operated independently of the former, the main key members of the coin-tubes being operatively connected by means causing the simultaneous operation of the pay-key mechanisms of the coins of lower denomination than that of the pay-key operated, the main key-member operatively connected with the auxiliary key-member; deducting mechanism in each coin-tube; means for temporarily locking the deducting mechanism against return movement; other means for releasing said locking means, and said releasing means connected with said auxiliary members of said pay-keys.

17. In a machine of the character described, a plurality of coin-tubes; a gate controlling the outlet of each coin-tube; pay-key mechanism operating such gates, each pay-key mechanism comprising main and auxiliary key members, the latter adapted to be operated independently of the former, the main key members of the coin tubes being operatively connected by means causing the simultaneous operation of the pay key mechanisms of the coins of lower denomination than that of the pay key operated, the main key member operatively connected with the auxiliary key member; means in the coin-tubes for holding back a coin or coins; deducting mechanism in each coin tube; means for temporarily locking the deducting mechanism against return movement; other means for releasing said locking means, and such hold-back mechanism and said releasing means connected with said auxiliary members of said pay keys.

JAMES A. PLOPPER.

Witnesses:
WM. C. SCHMITT,
CECIL LONG.